United States Patent

[11] 3,610,952

[72] Inventor Robert E. Chandos
Santa Barbara, Calif.

[21] Appl. No. 26,399
[22] Filed Apr. 7, 1970
[45] Patented Oct. 5, 1971
[73] Assignee Electro-Optical Industries, Inc.

[54] TRIANGLE WAVE GENERATOR
8 Claims, 4 Drawing Figs.

[52] U.S. Cl. .......... 307/228, 307/229, 307/261, 307/304, 328/35, 328/127, 328/181
[51] Int. Cl. .......... H03k 4/08
[50] Field of Search .......... 307/228, 229, 261, 304; 328/34–36, 127, 181

[56] References Cited

UNITED STATES PATENTS

| | | | |
|---|---|---|---|
| 3,256,426 | 6/1966 | Roth et al. | 328/127 X |
| 2,748,272 | 5/1956 | Schrock | 328/181 X |
| 3,302,132 | 1/1967 | Karklys | 307/229 X |
| 3,360,744 | 12/1967 | Blitz et al. | 328/127 X |

*Primary Examiner*—Stanley D. Miller, Jr.
*Attorney*—Finkelstein and Mueth

ABSTRACT: A waveform converter for automatically producing constant amplitude triangular wave signals from 50—50 square wave signals of varying amplitude and frequency. A variable-resistance device transfers the input signal into a fast integrator circuit that produces a triangle wave signal. A buffer stage removes the DC component and produces a buffered output triangular wave signal. A clipped portion of the output triangular wave signal is combined with a bias reference level. A slow integrator circuit integrates this combined signal and controls the resistance of the variable-resistance device. Negative feedback is provided to the variable resistance so as to increase or decrease the amplitude of the triangular output signal in order to maintain a constant amplitude output signal.

PATENTED OCT 5 1971 3,610,952
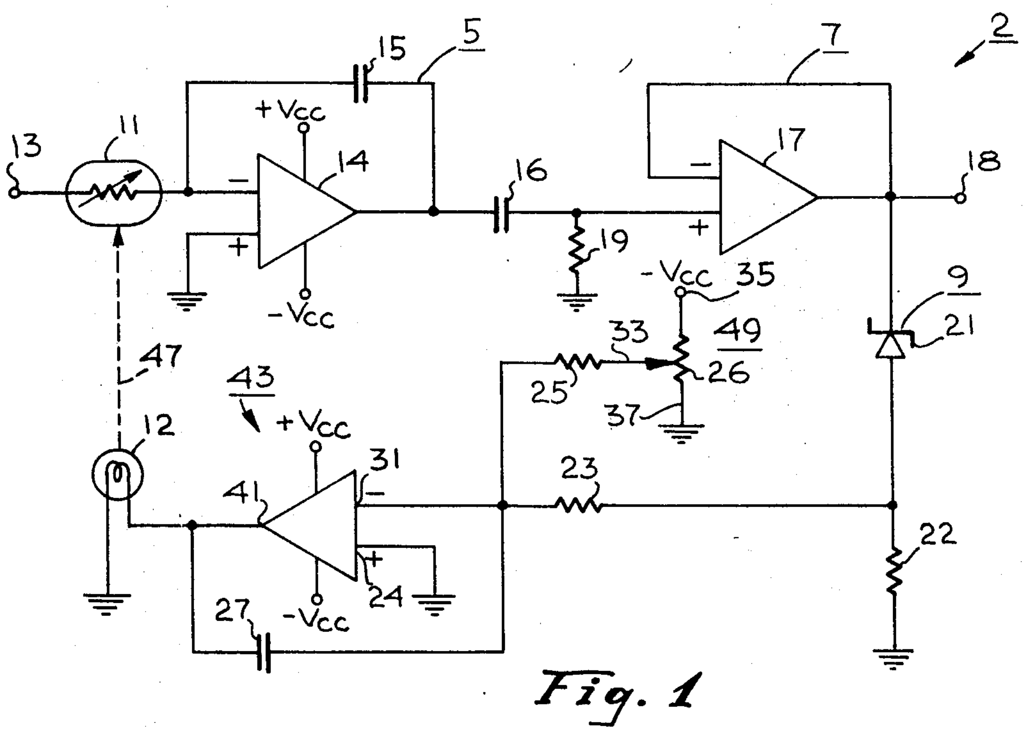
Fig. 1
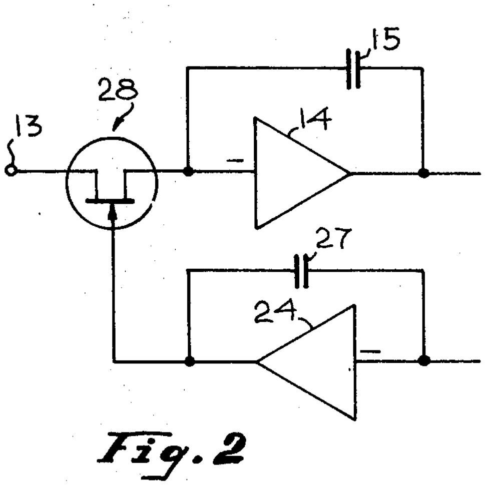
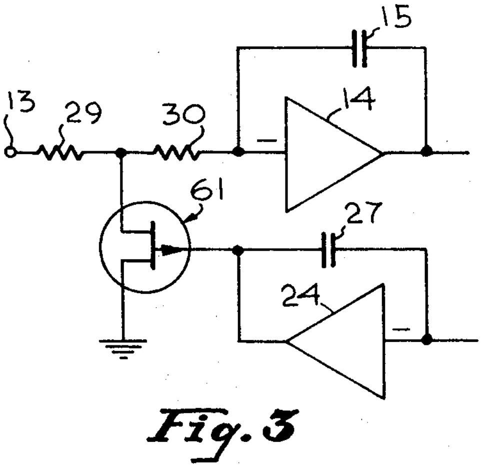
Fig. 2 Fig. 3
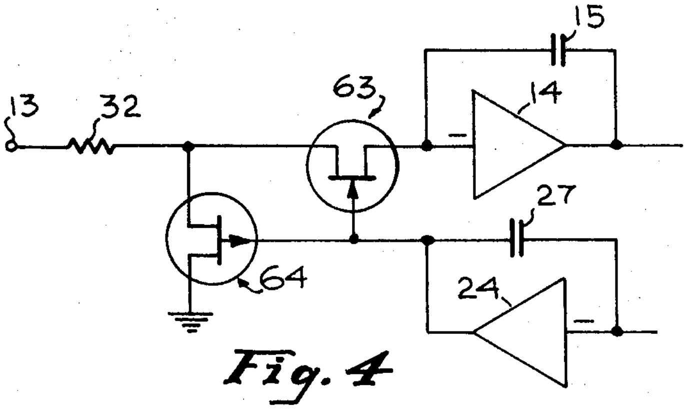
Fig. 4
INVENTOR
ROBERT E. CHANDOS
BY
Finkelstein & Muth
ATTORNEYS

TRIANGLE WAVE GENERATOR

BACKGROUND OF THE INVENTION

1. Field of the Invention

This invention relates to signal generators and more particularly to a circuit for automatically generating a constant amplitude triangular wave signal from a 50—50 square wave input signal.

2. Description of the Prior Art

Triangular voltage waveforms are commonly used as time bases in electronic control and computer circuits. Frequently it is necessary that the triangular signal generated have both a fixed amplitude and be symmetrical with respect to zero. In some cases the triangular voltage waveform must be generated from a square wave signal that, even though a 50—50 square wave signal, can vary in both frequency and amplitude. While there are known devices for converting square wave signals to triangular wave signals these devices generally cannot produce a fixed amplitude triangular signal output having the frequency of the input signal when the square wave input signal varies in both amplitude and frequency.

SUMMARY OF THE INVENTION

Accordingly, it is an object of the present invention to provide a device for automatically converting a square wave input signal into a constant amplitude triangular wave output signal regardless of changes in the amplitude or frequency of the input square wave signal.

SUMMARY OF THE INVENTION

According to the present invention the foregoing object is attained by providing a variable-resistance device to receive the square wave input signal and transfer the input signal to a fast integrator circuit which converts the square wave signal into an integrator output triangular wave signal. A buffer stage removes any DC component from the integrator output triangular wave signal and buffers it into a triangular wave output signal. A signal-clipping means that may comprise a zener diode connected to the output of the buffer applies a clipped portion of the triangular wave output signal, together with a bias signal, to a slow integrator circuit. The slow integrator circuit signal, comprising a control signal, is responsive to the voltage difference between the zener diode-clipped signal and the fixed (but controllable) bias signal. The slow integrator output is coupled to control the variable-resistance device in order to increase or decrease the time constant of the fast integrator circuit which varies the amplitude of the integrator output triangular wave signal and thereby maintains the triangular wave output signal at a constant amplitude.

DESCRIPTION OF THE DRAWINGS

FIG. 1 is a circuit diagram of one embodiment of the present invention; and

FIGS. 2, 3 and 4 are circuit diagrams of alternate variable-resistor circuits that could be employed in the embodiment of FIG. 1.

DESCRIPTION OF THE PREFERRED EMBODIMENTS

Referring now to FIG. 1 there is depicted one embodiment of the invention, generally designated 2, having a variable resistance 11, such as a light-sensitive cadmium selenide cell. The resistance of the cadmium selenide cell 11 is a function of the intensity of the light applied to the cell by light bulb 12.

One side of the variable resistance 11 is connected to input terminal 13, the other side is connected to the output of phase-inverting DC amplifier 14. Amplifier 14 is also connected to sources of positive +Vcc and negative −Vcc DC voltage. Capacitor 15 is connected across the input and output of amplifier 14. This combination of amplifiers 14 and capacitor 15 constitutes a fast integrator circuit 5. Capacitor 15 is chosen to make the circuit a fast integrator which integrates the portion of the square wave input signal coupled into the amplifier and produces a triangular waveform integrator output signal having linear rise and decay slopes. Integrators of this type and the design criteria for them are disclosed in detail, for example, in Functional Circuits and Oscillators by Herbert J. Reich, published 1961 by D. Van Nostrand Company, Inc., Princeton, N. J.

The output of fast integrator 5 is coupled through capacitor 16 to a linear amplifier 17 comprising a buffer means 7 which buffers the triangular wave fast integrator output signal and removes any DC component. The signal presented at output terminal 18 is the desired triangular wave output signal with suitable drive capability and no DC component. Resistor 19 is connected between the input of linear amplifier 17 and ground potential and serves to provide a DC path to ground.

The cathode of zener diode 21 is connected to the output of buffer means 7 comprising linear amplifier 17 while the anode is connected to one side of resistors 22 and 23. The other side of resistor 22 is connected to ground potential and the other side of resistor 23 is connected to the summing junction input 31 of phase-inverting DC amplifier 24. One side of resistor 25 is also connected to the summing junction input 31 of amplifier 24, the other side is connected to the wiper element 33 of potentiometer 26. Terminal 37 of the other two terminals of potentiometer 26 is connected to ground potential and the remaining terminal 35 is connected to the source of negative DC potential −Vcc. By varying the position of the wiper 33 of potentiometer 26 the voltage at the wiper terminal is varied, thus applying a bias current input to the summing junction 31 of amplifier 24. The portion of the triangular wave output signal which is greater than the zener voltage of zener diode 21 is summed into the input 31 of amplifier 24 along with the bias voltage.

Capacitor 27 is connected between the summing junction input 31 and output terminal 41 of amplifier 24 forming slow integrator 43 circuit. The value of capacitor 27 and resistor 25 are selected to produce a long time constant and, in conjunction with amplifier 24, form the slow integrator 43 circuit. This arrangement results in the voltage waveform of the output control signal at the output 41 of amplifier 24 possessing a slow rate of change and reacting slowly to variations in the signal presented at the summing junction input 31 of amplifier 24 in slow integrator 43. Amplifier 24 is also connected to sources of positive +Vcc and negative −Vcc DC voltage.

Light bulb 12 is connected to the output of slow integrator 43 for receiving the output control signal therefrom, and to ground potential. The intensity of light from light bulb 12 emitted in the direction indicated by arrow 47 and impinging on light-sensitive variable resistance 11, is dependent on the amplitude of the control signal appearing at the slow integrator 43 circuit output 41 which, in turn, is determined by the amplitudes of the clipped portion of the triangular wave output signal coupled through the clipping means 9 comprising zener diode 21. Light bulb 12 is positioned to illuminate the light-sensitive variable resistance 11 so that the value of the resistance 11 is determined by the peak amplitude of the triangular wave output signal.

In operation, the integration rate of amplifier 14 is dependent on the magnitude of resistance 11 which, in turn, depends on the intensity of the light received from light bulb 12. The square wave signal received at the input of phase-inverting amplifier 14 is converted into a triangular wave signal by the fast integrator 5 circuit formed by phase-inverting amplifier 14 and capacitor 15 and appears at the output of amplifier 14. This triangular wave signal is coupled to the input of buffer means 7 comprising linear amplifier 17 which, as noted, removes any DC component from the signal and provides the desired buffered triangular wave output signal at output terminal 18.

The position of the wiper of potentiometer 26, comprising the bias means 49, determines the bias current delivered to the summing junction input 31 of amplifier 24. If the amplitude of the output triangular waveform signal exceeds the breakdown voltage of the zener diode 21, the tips of the triangular waveform are passed through the zener diode 21 and coupled to the summing junction input 31 of phase-inverting amplifier 24 along with the DC bias signal from bias means 49. Phase-inverting amplifier 24 in conjunction with capacitor 27 form the slow integrator 43 circuit so that the control signal at the output of amplifier 24 and across light bulb 12 is an integrated version of the input signal.

If the amplitude of the triangular wave output signal is low, none or only a small portion of the output signal will appear at the summing junction input 31 of amplifier 24. In that case, the level of the control signal at the output 41 of amplifier 24 will increase since it would represent the integral of an inverted negative signal of an almost constant level. This increase in the output signal level would increase the intensity of the light from light bulb 12 that illuminates light-sensitive variable resistance 11. An increase in the intensity of this light decreases the resistance of variable resistance 11 and thereby increases the rate of integration of fast integrator 5 which results in an output triangular wave signal of increased amplitude. This process continues with succeeding cycles of the output signal until the proper amplitude output is obtained.

If the amplitude of the triangular wave output signal is too large, a larger portion of the output signal will appear at the summing junction input of amplifier 24, through clipping means 9. The level of the control signal at the output 41 of amplifier 24 will decrease since it represents the integral of an inverted, positive input signal. This decrease in the level of the voltage appearing in the control signal at the output 41 of amplifier 24 decreases the intensity of the light from bulb 12 and thus the light illuminating light-sensitive variable resistance 11 which results in an increase in resistance 11. This increased resistance results in a decreased rate of integration of fast integrator 5 so that the amplitude of the output triangular wave signal is reduced accordingly.

Thus, whether the triangular wave output signal amplitude is too high or too low, the feedback arrangement just described serves to correct the amplitude and maintain a constant amplitude output signal.

While the embodiment 2 of the invention shown in FIG. 1 employed a light-sensitive variable resistance 11 in conjunction with a light bulb 12 to provide the variable resistance feedback element, it would be appreciated that various other devices could be employed. In FIG. 2 a variable resistance element consisting of a Field Effect Transistor (FET) is shown. The drain input of FET 28 is connected to input terminal 13 and the source input is connected to the input of fast integrator 5. The output of the amplifier 24 of slow integrator 43 now feeds the gate input of FET 28. As the voltage level of the output control signal of slow integrator 43 varies, the resistance presented by the series connection of FET 28 in the input circuit of amplifier 14 of fast integrator 5 varies so as to vary the rate of integration of fast integrator 5. In this way FET 28 provides a variable-resistance element for feedback control.

Another variable-resistance arrangement involving a FET is shown in FIG. 3. In this embodiment series resistors 29 and 30 are connected between input terminal 13 and the input to amplifier 14 of fast integrator 5. The drain input of FET 61 is connected to the common connection of resistors 29 and 30 and the source input connection of FET 61 is coupled to ground potential. The output of amplifier 24 of slow integrator 43 is connected to the gate input of FET 61. As the voltage level of the output control signal of slow integrator 43 varies, the resistance presented by FET 61 between ground potential and the common connection of resistors 29 and 30 varies. This causes the amplitude of the input square wave signal presented at the common connection of resistors 29 and 30 to vary which, in turn, varies the amplitude of the input square wave signal coupled to the input of amplifier 14 of fast integrator 5. Thus FET 61 acts as a variable resistance element for feedback control.

Still another variable-resistance arrangement involving FETs is shown in FIG. 4. In this case two FETs, 63 and 64 are employed. FET 63 is connected in series with resistor 32 between input terminal 13 and the input to amplifier 14 of fast integrator 5. FET 64 is connected between the common connection of resistor 32 and FET 63 and ground potential. The output of amplifier 24 of slow integrator 43 is connected to the gate inputs of FETs 63 and 64. In this arrangement FET 63 functions in the same manner as FET 28 of FIG. 2 while FET 64 functions in the same manner as FET of FIG. 3. This particular arrangement provides for a wider range of feedback control.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the invention, therefore, to be limited only as indicated by the scope of the following claims.

What is claimed is new and desired to be secured by Letters Patent of the United States is:

1. Signal-converting apparatus for producing a constant-amplitude triangular wave signal from a square wave signal comprising:

variable-resistance means having an input and output, and a control input, and the input adapted to receive the square wave input signal, and an attenuated version of the square wave input signal appearing at the output, and the control input for accepting control signals to vary the variable resistance between the input and output;

a fast integrator circuit having an input and output, the input connected to the variable-resistance output to integrate the attenuated square wave input signal and produce a fast integrator triangular wave signal at the output;

buffer means having an input and an output, the input connected to the fast integrator output for providing at t the a triangular wave output signal comprising a buffered version of the fast integrator triangular wave output signal;

clipping means having an input and an output for receiving the triangular wave output signal at the input and presenting at a clipped signal output in response thereto representing the portion of the triangular wave output signal having an amplitude above a predetermined amplitude;

bias means having an output for generating a bias signal at the output; and a slow integrator circuit having an input and output, and the input connected to both the output of the clipping means and the output of the bias means for receiving the bias signal and the clipped signal and generating a control signal at the output, said control signal representing an integrated version of the combined bias signal and clipped signal, and the integrator circuit output connected to provide the control signal for varying the variable resistance in response to to variations in the control signal.

2. The signal-converting apparatus of claim 1 wherein:

the fast integrator circuit comprises a phase-inverting amplifier and a capacitor connected between the phase-inverting amplifier input and output;

the buffer means comprises a DC linear amplifier; and the slow integrator comprises a phase-inverting amplifier and a capacitor connected between the input and output.

3. The signal converting apparatus of claim 2 wherein:

the clipping means comprises a zener diode;

the bias means comprises a potentiometer adapted to receive a source of DC power and having the wiper element connected to the input of the slow integrator.

4. The signal converting apparatus of claim 3 wherein:

the variable-resistance means comprises a light-sensitive variable resistor; and the slow integrator circuit includes a light bulb connected between the integrator circuit output and ground potential for receiving the control signal and varying the light output in response thereto and positioned to illuminate the light-sensitive variable resistor with said light output.

5. The signal-converting apparatus of claim 3 wherein the variable-resistance means comprises at least one field-effect transistor having drain, source and gate terminals.

6. The signal-converting apparatus of claim 5 wherein:

the drain terminal of the field-effect transistor is connected to the input square wave signal, the source terminal is connected to the input of the fast integrator circuit, and the gate input is connected to the output of the slow integrator for receiving the control signal.

7. The signal-converting apparatus of claim 5 wherein:

two resistors are connected in series to the fast integrator circuit input;

the drain terminal of the field-effect transistor is connected to the common junction of the series resistors;

the source terminal of the field-effect transistor is connected to ground potential; and the gate terminal of the field-effect transistor is connected to the output of the slow integrator for receiving the control signal.

8. The signal converting apparatus of claim 4 wherein the variable-resistance comprises:

a first and second field-effect transistor;

a resistor with one side of the resistor connected to receive the square wave signal input;

the drain terminals of the first and second field-effect transistors connected to the other side of the resistor;

the source terminal of the first field-effect transistor is connected to ground potential;

the source terminal of the second field-effect transistor connected to the fast integrator circuit input; and the gate terminals of the first and second field-effect transistors coupled to the slow integrator circuit output for receiving the control signal.